(12) United States Patent
Schaffer

(10) Patent No.: US 6,371,237 B1
(45) Date of Patent: Apr. 16, 2002

(54) STEERING SYSTEM FOR VARIABLE HEIGHT AGRICULTURAL SPRAYER

(75) Inventor: James A. Schaffer, Clarion, IA (US)

(73) Assignee: Hagie Manufacturing Company, Clarion, IA (US)

( * ) Notice: Subject to any disclaimer, the term of this patent is extended or adjusted under 35 U.S.C. 154(b) by 0 days.

(21) Appl. No.: 09/656,282

(22) Filed: Sep. 6, 2000

(51) Int. Cl.$^7$ .............................................. B60K 17/30
(52) U.S. Cl. .................. 180/253; 140/403; 280/93.504; 280/124.17
(58) Field of Search ................................. 180/252, 253, 180/403, 408, 414; 280/93.504, 124.121, 124.123, 124.117, 124.154, 124.127, 124.146, 124.147, 124.155

(56) References Cited

U.S. PATENT DOCUMENTS

| | | |
|---|---|---|
| 630,361 A | 8/1899 | Klumb |
| 1,114,418 A | 10/1914 | Westlake et al. |
| 1,270,350 A | 6/1918 | Watkins |
| 2,094,882 A | 10/1937 | Garnett et al. |
| 2,115,072 A | 5/1938 | Hunt et al. |
| 2,220,254 A | 11/1940 | Maier |
| 2,257,422 A | 9/1941 | Maier |
| 2,298,529 A | 10/1942 | Dimick |
| 2,567,144 A | 9/1951 | Butterfield |
| 2,865,651 A | 11/1958 | Chayne et al. |
| 2,887,324 A | 5/1959 | Jackson |
| 2,902,290 A | 9/1959 | Hausmann |
| 2,934,356 A | 4/1960 | Killinger |
| 3,006,657 A | 10/1961 | Augustin |
| 3,033,553 A | 5/1962 | Allinquant |
| 3,042,392 A | 7/1962 | Schmitz et al. |
| 3,042,422 A | 7/1962 | Garnett |
| 3,071,393 A | 1/1963 | Valentine |
| 3,148,871 A | 9/1964 | Wilkins et al. |
| 3,331,616 A | 7/1967 | Jackson |
| 3,480,288 A | 11/1969 | Vogel et al. |
| 3,565,455 A | 2/1971 | Kostas et al. |
| 3,604,725 A | 9/1971 | Goff et al. |
| 3,741,581 A | 6/1973 | Patrin |
| 3,758,064 A | 9/1973 | Sawaki |
| 3,762,240 A | 10/1973 | Adams |
| 4,071,277 A | 1/1978 | Stedman |
| 4,184,600 A | 1/1980 | Goss et al. |
| 4,342,372 A | 8/1982 | Hayes |
| 4,422,657 A | 12/1983 | Swanson |
| 4,453,734 A | 6/1984 | McGhie et al. |
| 4,531,759 A | 7/1985 | Rezanka |
| 4,566,553 A | * 1/1986 | McCutcheon ................ 180/237 |
| 4,783,095 A | 11/1988 | Rampini et al. |
| 4,865,343 A | 9/1989 | Cler et al. |
| 4,913,680 A | * 4/1990 | Desmarais ................... 180/414 |
| 4,961,594 A | 10/1990 | Pees |
| 5,039,129 A | 8/1991 | Balmer |
| 5,192,100 A | * 3/1993 | Rumpel et al. ....... 280/124.143 |
| 5,492,353 A | 2/1996 | Chapman |
| 5,547,038 A | * 8/1996 | Madwed ..................... 180/907 |
| 5,597,172 A | 1/1997 | Maiwald et al. |
| 5,836,399 A | 11/1998 | Maiwald et al. |

FOREIGN PATENT DOCUMENTS

| | | |
|---|---|---|
| DE | 825408 | 12/1959 |
| GB | 474506 | 11/1937 |
| GB | 771663 | 4/1957 |
| GB | 870450 | 6/1961 |

* cited by examiner

Primary Examiner—Daniel G. DePumpo
(74) Attorney, Agent, or Firm—Brett J. Trout

(57) ABSTRACT

A steering mechanism for a ride height adjustable vehicle is provided having a leg which is coupled to a wheel and rotatably coupled within a journal. A base plate is secured to the leg and a pair of uprights are secured to the journal. The uprights are secured to the journal substantially parallel to one another. The uprights are secured to the top of a spring and the spring is secured to a spring plate. Means are provided for rotating the base plate relative to the spring plate, and the spring plate is slidably coupled to both the first upright and the second upright.

20 Claims, 6 Drawing Sheets

STEERING SYSTEM FOR VARIABLE HEIGHT AGRICULTURAL SPRAYER

BACKGROUND OF THE INVENTION

1. Field of the Invention

The present invention relates to a steering system for a variable height agricultural sprayer and, more particularly, to an improved steering system for a variable height agricultural sprayer which maintains a predetermined wheel orientation over uneven terrain.

2. Description of the Prior Art

Ride height adjustment systems for agricultural sprayers are known in the art. Such systems typically involve an outer journal provided with an inner leg which rotates relative to the outer journal. In addition to the ride height adjustment, it is also desirable to include a cushioning system to add to driver comfort when operating the agricultural sprayer. A cushioned ride height adjustment system is shown in U.S. Pat. No. 5,597,172.

Prior art suspensions, however, use a large number of large parts, which not only increase the cost and weight of the suspension system, but also the maintenance costs as well. An additional drawback of such prior art suspension systems is that they require a large unobstructed area for proper operation. Prior art suspension systems often utilize a linear actuator coupled to the frame and a scissor assembly which extends beyond the frame of the suspension system. These assemblies require a large unobstructed area which limits their application on more compact agricultural sprayers.

Accordingly, it would be desirable to provide a more compact steering assembly, incorporating fewer, more easily maintained parts. The difficulties encountered hereinabove are sought to be eliminated by the present invention.

SUMMARY OF THE INVENTION

The present invention comprises a steering mechanism for a ride height adjustable vehicle comprising a journal, a leg rotatably coupled within the journal, the leg having a first end and a second end, a wheel coupled to the first end of the leg, a base plate secured to the second end of the leg, a spring having a first end and a second end, a first upright having a first end and a second end, wherein the first end of the first upright is secured to the journal, and wherein the second end of the first upright is coupled to the second end of the spring, a second upright substantially parallel with the first upright, the second upright having a first end and a second end, wherein the first end of the second upright is secured to the journal, and wherein the second end of the second upright is coupled to the second end of the spring, a spring plate is secured to the first end of the spring wherein the spring plate is slidably coupled to the first upright, and wherein the spring plate is slidably coupled to the second upright, and means secured to the base plate and to the spring plate for rotating the base plate relative to the spring plate.

DETAILED DESCRIPTION OF THE PREFERRED EMBODIMENT

Figure 1:
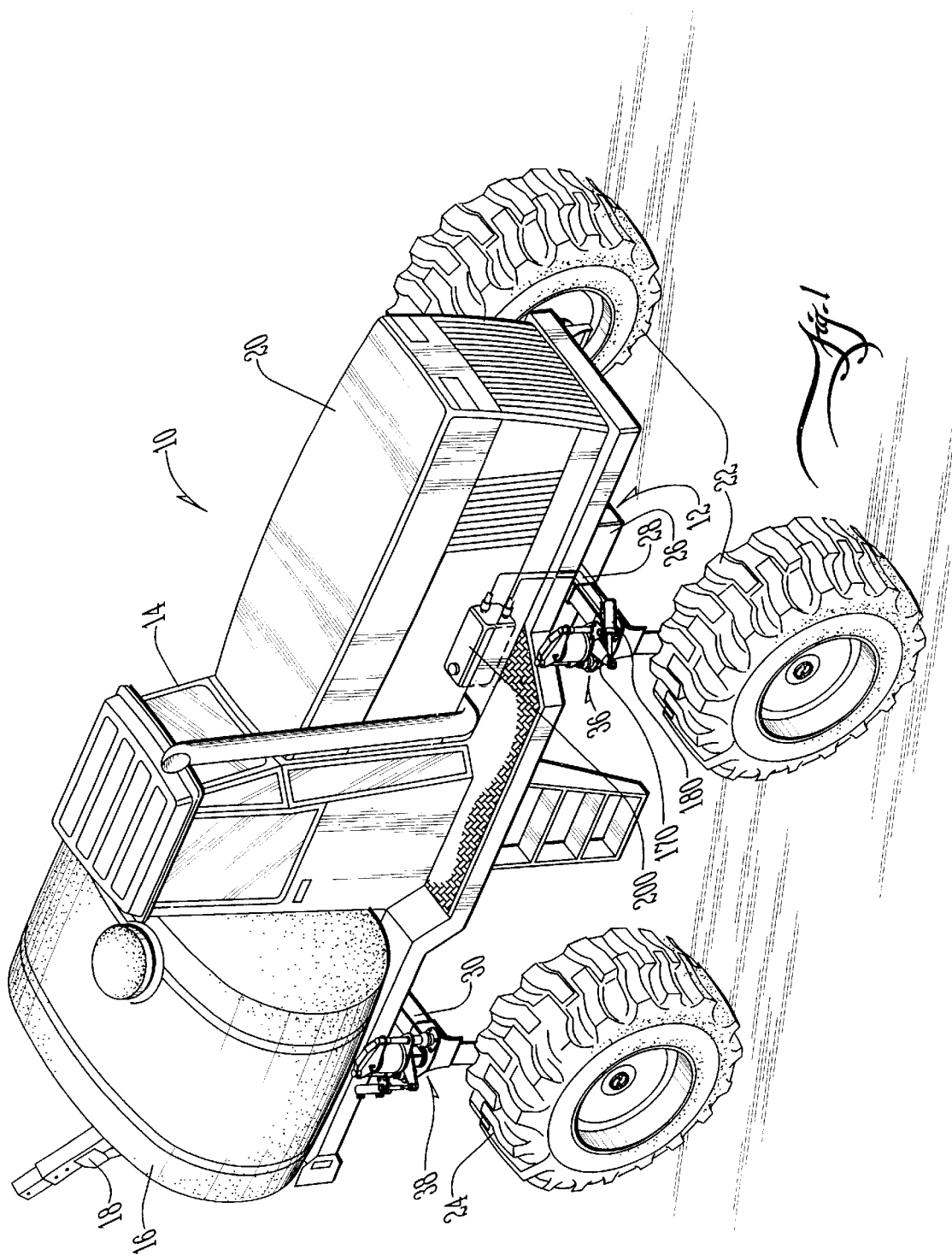
FIG. 1 illustrates a perspective view of an agricultural sprayer incorporating the steering mechanism of the present invention.

With reference to the drawings, an agricultural sprayer incorporating the steering system of the present invention is indicated generally as (10) in FIG. 1. As shown in FIG. 1, the agricultural sprayer (10) includes a frame (12), a cab (14), and a fluid tank (16). Secured to the frame (12) is a boom (18) for securement of a sprayer (not shown) to supply liquid onto the ground, or a similar attachment. The agricultural sprayer (10) also includes an engine (20), to drive a pair of front wheels (22) and a pair of rear wheels (24).

Figure 2:
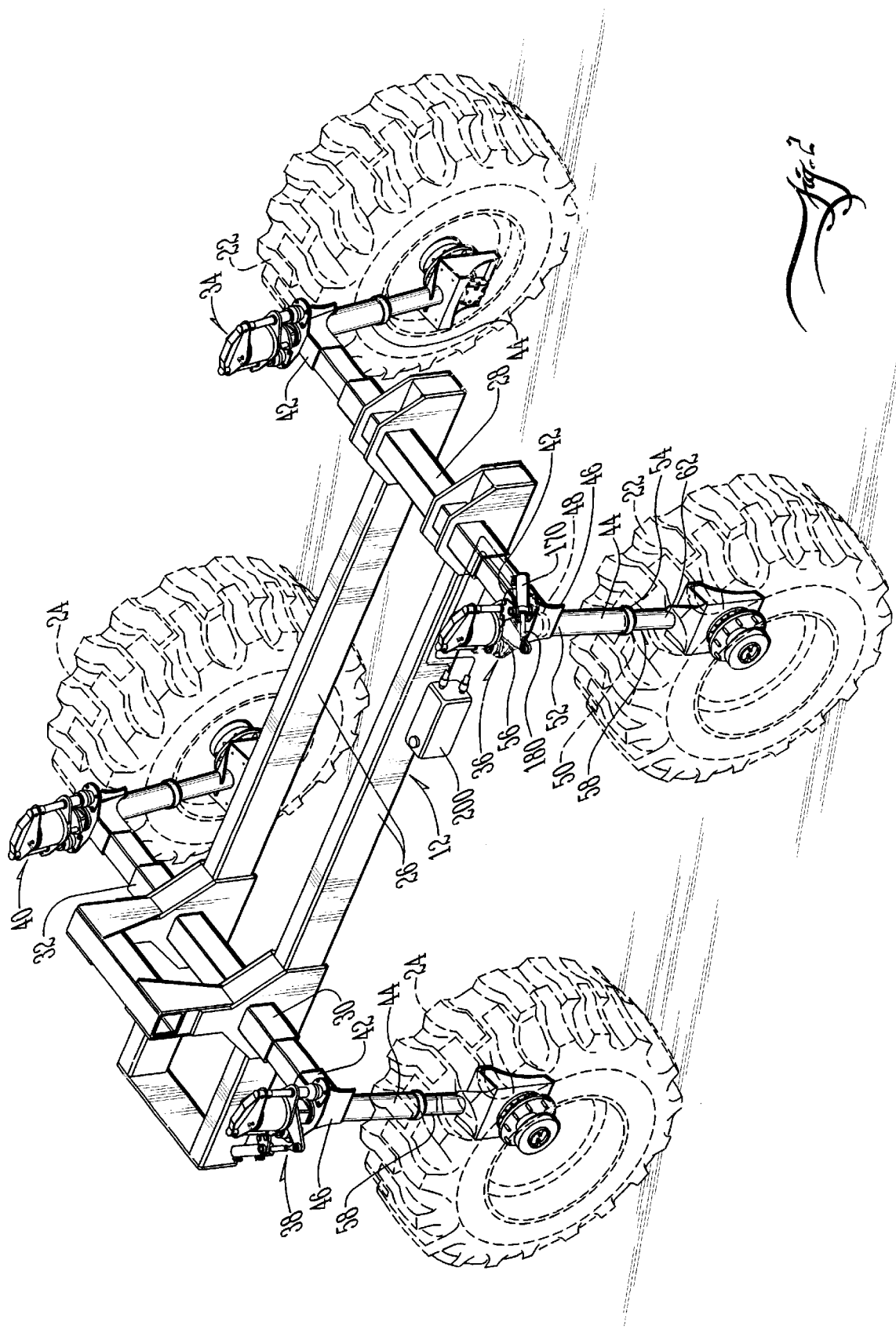
FIG. 2 illustrates a perspective view of the frame and steering assemblies of the agricultural sprayer of FIG. 1.

As shown in FIG. 2, the frame (12) includes a pair of side members (26) interconnected by a front transverse member (28). A rear transverse member (30) is welded, or otherwise secured, to the side members (26). Secured to the front transverse member (28) and the rear transverse member (30) are four steering assemblies (34), (36), (38) and (40). Since the steering assemblies (34), (36), (38) and (40) are of a like construction and similarly assembled, albeit as mirror-imaged pairs, only the steering assembly (34) will be described in detail, with like numbers being applied to like parts.

Figure 6:
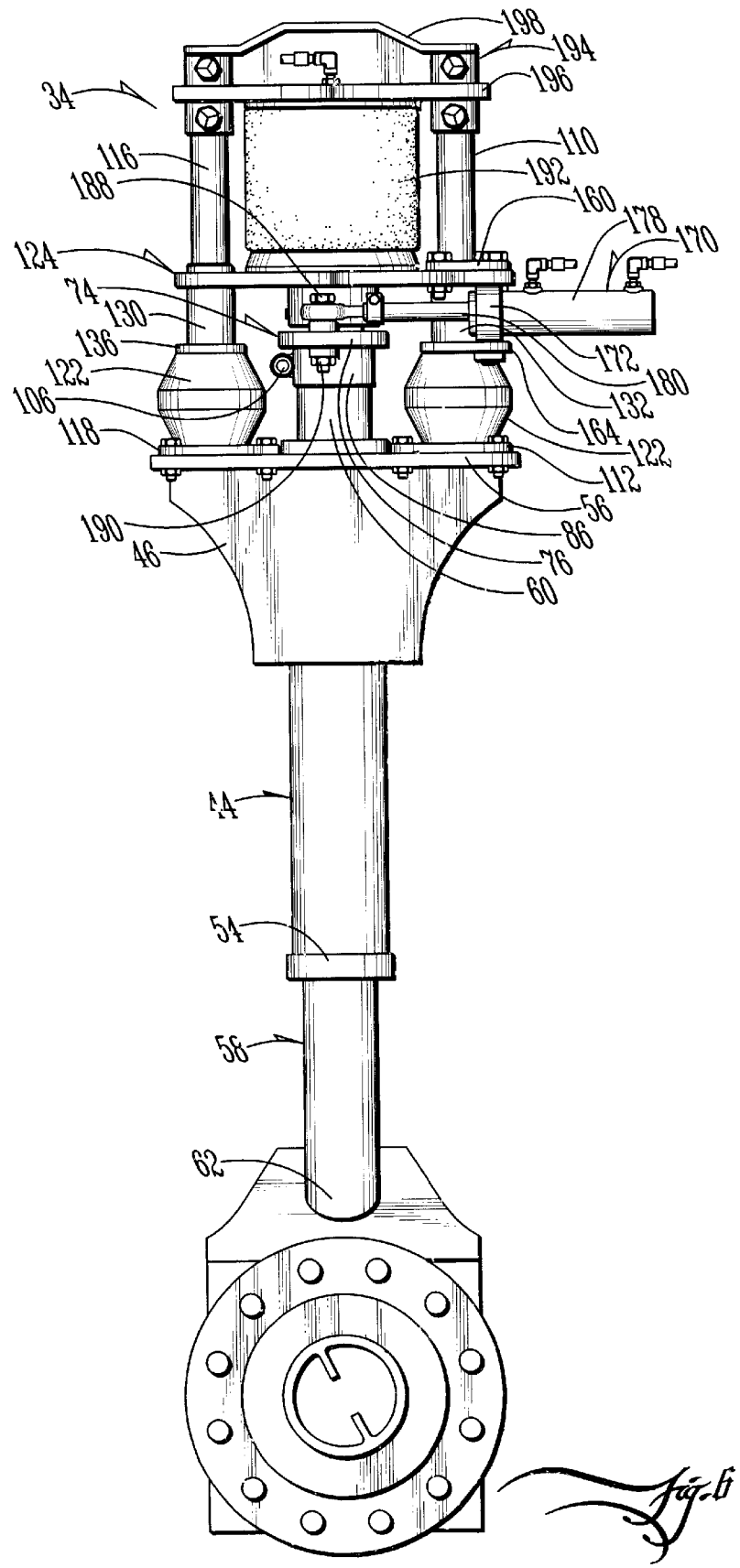
FIG. 6 illustrates a side elevation of the steering assembly of the present invention.
Figure 7:
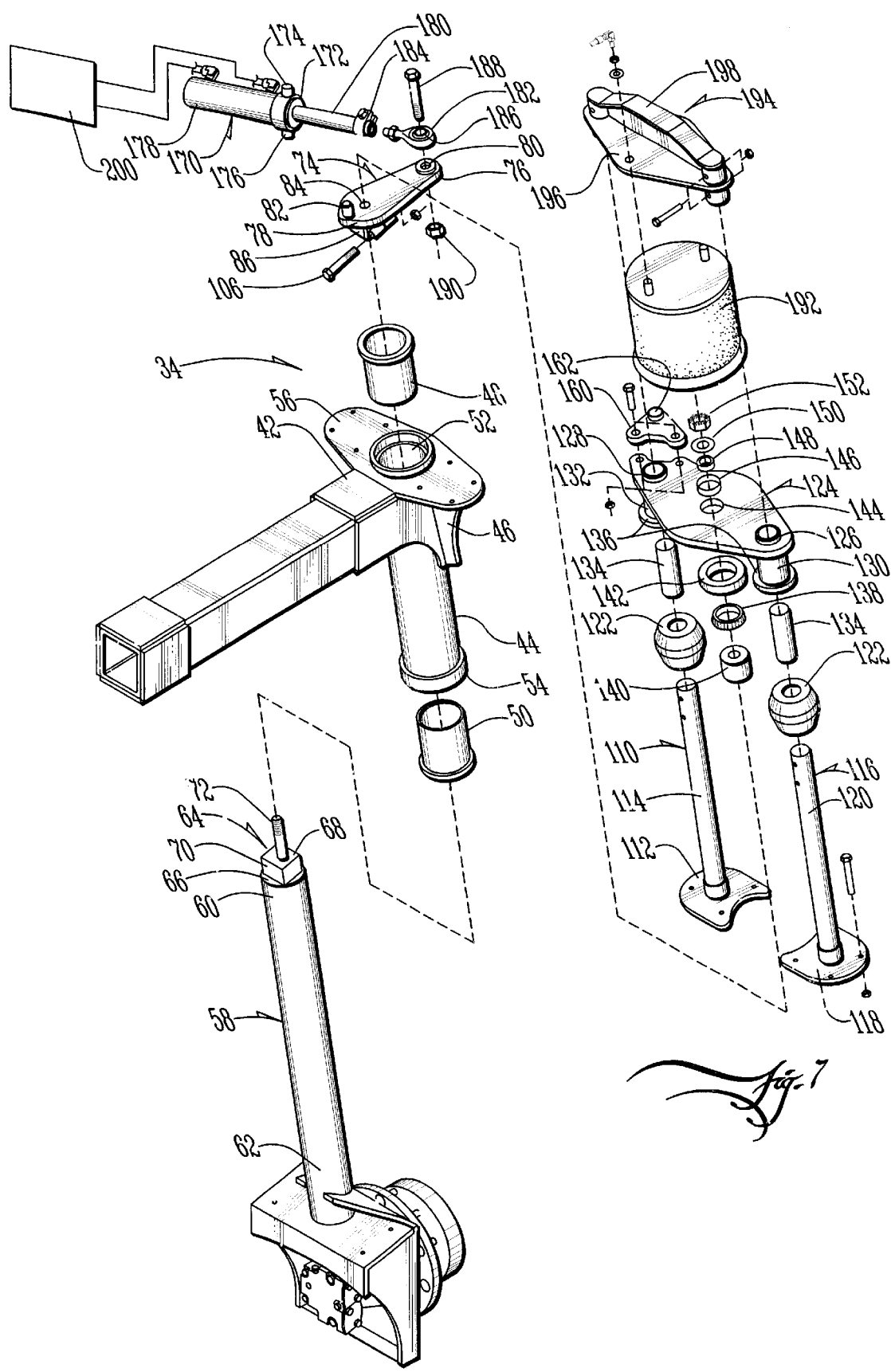
FIG. 7 illustrates an exploded view of the steering assembly of the present invention.

As shown in FIGS. 2–7, a leg sleeve (42) fits over the transverse member (28) to secure the steering assembly (34) to the transverse member (28). The leg sleeve (42) is welded or otherwise secured to an outer journal (44) by a shoulder (46) as shown in FIG. 7. The outer journal (44) is provided with a pair of composite bushings (48) and (50), secured within the top (52) and bottom (54) of the outer journal (44). In the preferred embodiment, bushings (48) and (50), such as those sold under the trade name Orkot® are used. The bushings (48) and (50) may, of course, be constructed of any suitable material, such as molybdenum coated nylon, or any other bushing material known in the art. The outer journal (44) is also provided with a steel retaining flange (56).

Provided through the bushings (48) and (50) is an inner leg (58) having a top (60) and a bottom (62). The top (60) of the leg (58) includes a connection assembly (64) comprising a circular securement plate (66) welded or otherwise secured to the hollow leg (58) and to a torque transfer block (68). As shown in FIG. 7, the torque transfer block (68) is provided with four lateral planer surfaces (70), recessed so that none of the lateral planer surfaces (70) extend laterally beyond the leg (58).

Figure 3:
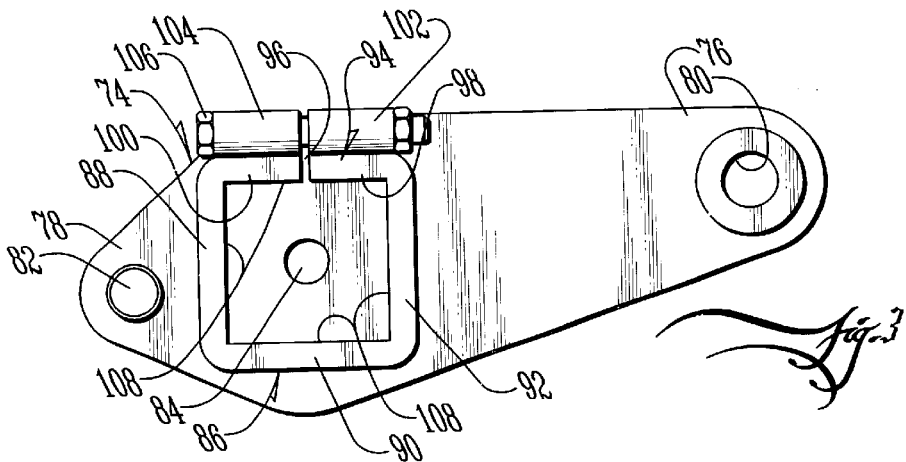
FIG. 3 illustrates a bottom plan view of the base plate of the present invention.

Provided through the torque transfer block (68), and welded thereto, is a bolt (72). Provided over the connection assembly (64) is a base plate (74). The base plate (74) includes a torque arm (76) and a stop arm (78) (FIG. 3). On the torque arm (76), the base plate (74) is provided with a bore (80). On the stop arm (78), the base plate (74) is provided with a steel post (82) welded or otherwise secured to the stop arm (78). Provided between the bore (80) and stop arm (78) is another bore (84) sized to accommodate the bolt (72).

Welded to the base plate (74), around the bore (84), is a collar (86) (FIG. 3). The collar (86) comprises a left wall (88), a rear wall (90), a right wall (92) and a front wall (94). In the preferred embodiment, the left wall (88), rear wall (90) and right wall (92) are welded or otherwise secured to the base plate (74).

The front well (94) of the collar (86) is provided with a split (96) which divides the front wall (94) into a first half (98) and second half (100). Welded to the first half (98) of the front wall (94) is a first bushing (102), and welded to the second half (100) of the front wall (94) is a second bushing (104). As shown in FIGS. 3 and 6, a bolt (106) is secured within the first bushing (102) and second bushing (104) which, when tightened, draws the first half (98) of the front wall (94) toward the second half (100) of the front wall (94). Approximately two centimeters of the left wall (88) and the right wall (92) closest to the front wall (94) are not welded to the base plate (74) to allow the halves (98) and (100) of the front wall (94) to move relative to one another. Accordingly, when the bolt (106) is tightened within the first bushing (102) and second bushing (104), the plurality of substantially flat surfaces (108) of the collar (86) engage the lateral planer surfaces (70) of the connection assembly (64) of the leg (58).

A first steel shaft assembly (110), including a first mounting plate (112) and a first steel shaft (114), is provided along with a second steel shaft assembly (116), including a second mounting plate (118) and a second steel shaft (120) (FIG. 7). The shafts (114) and (120) are secured to their respective mounting plates (112) and (118) by weldments. The mounting plates (112) and (118) are, in turn, bolted to the retaining flange (56). Provided over the shafts (114) and (120) are a pair of rubber springs (122) such as those known in the art. A spring plate (124) is provided over the rubber springs (122). As shown in FIG. 6, the spring plate (124) is provided with a first bore (126) and second bore (128) to accommodate the shafts (114) and (120). Provided within the bore (126) and (128) are a first sleeve (130) and second sleeve (132), each provided with slide bearings (134). The sleeves (130) and (132) are preferably of steel construction and welded to the spring plate (124). The sleeves (130) and (132) are preferably provided with broad bases (136) to provide a greater contact surface with the rubber springs (122). As shown in FIG. 7, provided between the spring plate (124) and transfer block (68) over the bolt (72) is a bearing assembly (138), surrounding an inner spacer (140), and surrounded by a bearing cup (142) such as those known in the art. Similarly, the spring plate (124) is provided with a center bore (144) within which is provided a smaller bearing cup (146), and a smaller bearing assembly (148) which surrounds the bolt (72). Provided over the bolt (72) is a washer (150) and a nut (152).

Figure 4:
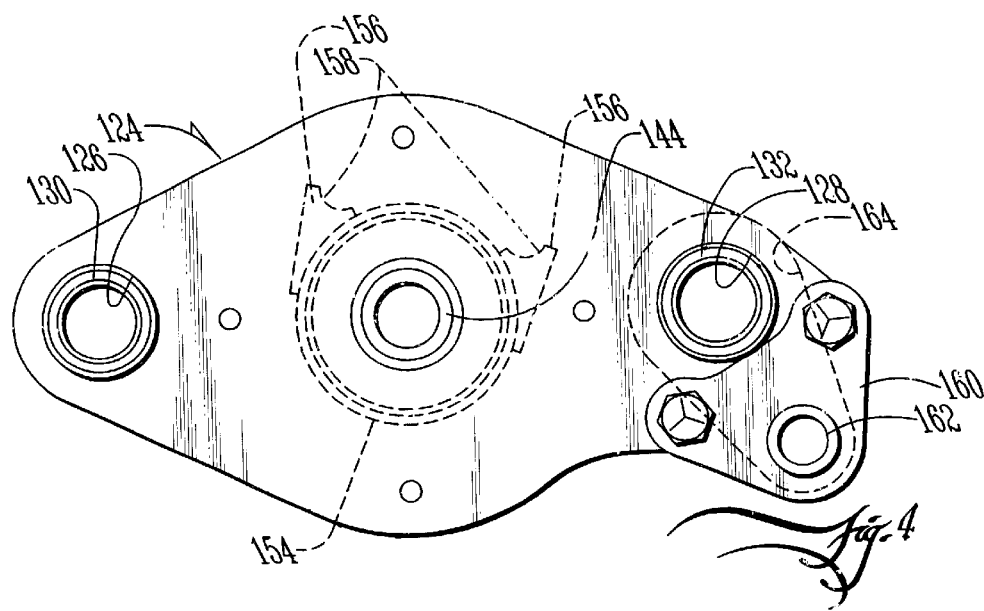
FIG. 4 illustrates a top plan view of the spring plate assembly of the present invention.
Figure 5:
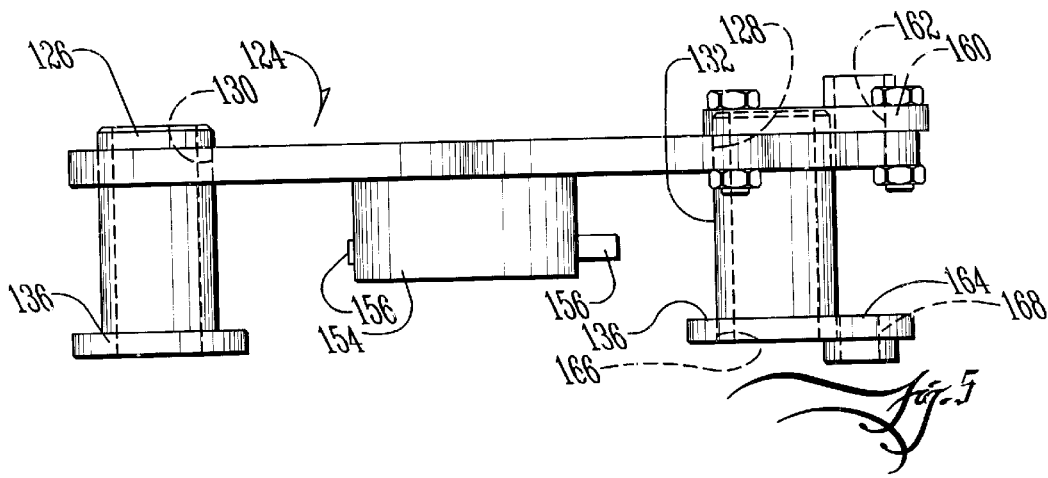
FIG. 5 illustrates a side elevation of the spring plate of FIG. 4.

As shown in FIGS. 4 and 6, the spring plate (124) is provided with a collar (154), which covers the bearing assembly (138), inner spacer (140) and bearing cup (142). Secured to the collar (154) by weldments or similar securement means is a pair of steel steering stops (156). The steering stops (156) are preferably provided with recesses (158) configured for mating engagement with the post (82) of the stop arm (78). Bolted to the spring plate (124) is a trunion plate (160) provided with a bore (162). A trunion mounting ear (164) is provided with a first bore (166) for mounting around the second sleeve (134). The trunion mounting ear (164) is also provided with a second bore (168).

As shown in FIG. 6, a hydraulic piston (170) such as those known in the art is provided with a trunion (172), having a first pin (174) and a second pin (176). As shown in FIG. 7, the first pin (174) of the trunion (172) is positioned within the bore (162) of the trunion plate (160) and the second pin (176) of the trunion (172) was positioned within the second bore (168) of the trunion mounting ear (164). This trunion connection allows the hydraulic piston (170) to pivot laterally relative to the spring plate (124).

The hydraulic piston (170) includes a hydraulic chamber (178) and a shaft (180), slidably coupled thereto (FIGS. 6 and 7). An eyelet bolt (182) is threadably engaged to the shaft (180) of the hydraulic piston (170). A clamp (184) is tightened around the shaft (180) at the point where the eyelet bolt (182) couples to the shaft (180). The eyelet bolt (182) is preferably provided with an eyelet (186) provided around its circumference with Orkot® or a similar low-friction material. A bolt (188) extends through the eyelet (186) and the bore (80) of the torque arm (76), and is secured therein by a nut (190).

As shown in FIG. 7, provided over the bolt (72) is a pneumatic air spring (192) such as those known in the art. The pneumatic air spring (192) is bolted or otherwise secured to a top plate (194) which, in turn, is bolted or otherwise secured to the shafts (114) and (120). The top plate (194) is preferably provided with a wide, flat surface (196) to increase surface contact with the pneumatic air spring (192). The top plate (194) is also provided with a strengthening rib (198) to transfer force from the pneumatic air spring (192), through the flat surface (196) and through the rib (198) to the shafts (114) and (120). When it is desired to operate the steering assembly of the present invention, the hydraulic piston (170) is coupled to a hydraulic fluid pump (200).

As shown in FIGS. 1 and 7, if hydraulic fluid is pumped from the hydraulic fluid pump (200) into the hydraulic piston (170) so as to extend the shaft (180), the eyelet bolt (182) forces the torque arm (76) of the base plate (74) to rotate. This action causes the collar (86) on the bottom of the base plate (74) to force the torque transfer block (68), and the inner let (58) to which it is connected, to rotate and turn the front wheels (22) to the right. Conversely, if hydraulic fluid is forced through the hydraulic piston (170) in the opposite direction, so as to retract the shaft (180), the shaft (180) draws the eyelet bolt (182) and torque arm (76) of the base plate (74) toward the hydraulic chamber (178), thereby causing the front wheels (22) to turn to the left.

To prevent damage to the agricultural sprayer (10), which may result from turning the wheels (22) and (24) too sharply, the steering stops (156) are adjusted to engage the post (82) of the base plate (74) to precisely limit the maximum travel of the base plate (74) relative to the spring plate (124). By moving the hydraulic piston (170) up and down with the pneumatic air spring (192), steering assemblies (34), (36), (38) and (40) are more compact, require less maintenance, and use less parts than prior art steering assemblies.

Figure 8:
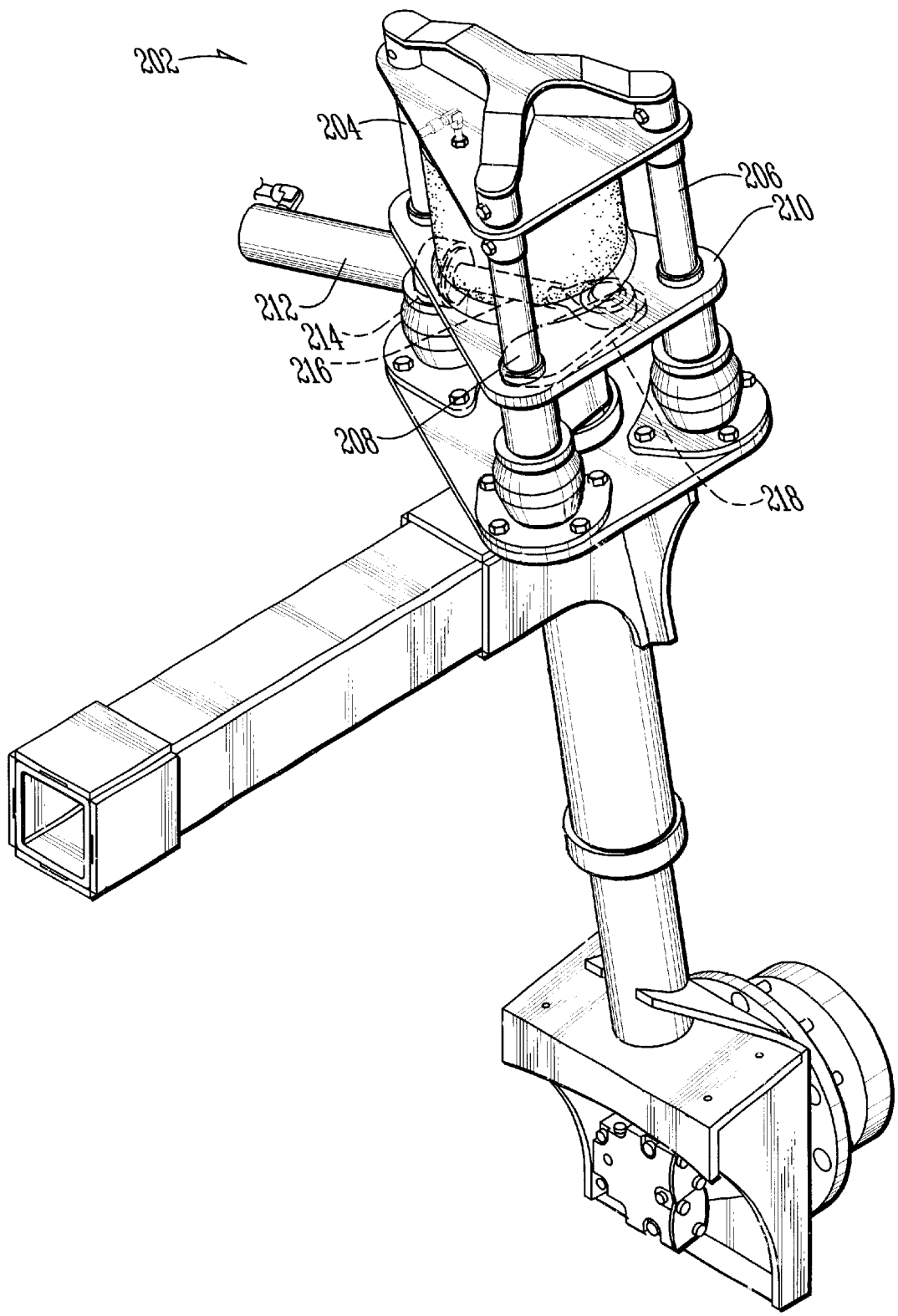
FIG. 8 illustrates a perspective view of an alternative embodiment of the steering assembly of the present invention, incorporating three upright shafts slidably coupled to a spring plate.

An alternative embodiment of the steering assembly of the present invention is shown generally as (202) in FIG. 8. As shown in FIG. 8, the steering assembly (202) is provided with three upright shafts (204), (206) and (208), all slidably coupled to a spring plate (210). As in the preferred embodiment, a hydraulic piston (212) is pivotally secured by a trunion (214) to the spring plate (210). A shaft (216) of the hydraulic piston (212) is pivotally secured to a base plate (218) in a manner such as that described above, to allow forced hydraulic fluid to rotate the base plate (218) relative to the spring plate (210). Of course, it should be noted that four, five or any additional number of upright shafts may be used to provide additional support for the steering assembly (202).

The foregoing description and drawings merely explain and illustrate the invention. The invention is not limited thereto, except insofar as the claims are so limited, as those skilled in the art who have the disclosure before them will be able to make modifications and variations without departing from the scope of the invention. For example, it is anticipated that the steering assemblies (34), (36), (38) and (40) may be constructed of any suitable materials and dimensions. It is further anticipated that the steering assemblies (34), (36), (38) and (40) may be used on any type of vehicle, or any rotatable shock absorptive system.

What is claimed is:

1. A steering mechanism for a ride height adjustable vehicle comprising:
    (a) a journal;
    (b) a leg rotatably coupled within said journal, said leg having a first end and a second end;
    (c) a wheel coupled to said first end of said leg;
    (d) a base plate secured to said second end of said leg;
    (e) a spring having a first end and a second end;
    (f) a first upright having a first end and a second end, wherein said first end of said first upright is secured to said journal and wherein said second end of said first upright is coupled to said second end of said spring;
    (g) a second upright substantially parallel with said first upright, said second upright having a first end and a second end, wherein said first end of said second upright is secured to said journal and wherein said second end of said second upright is coupled to said second end of said spring;
    (h) a spring plate secured to said first end of said spring, wherein said spring plate is slidably coupled to said first upright and wherein said spring plate is slidably coupled to said second upright; and
    (i) means secured to said base plate and to said spring plate for rotating said base plate relative to said spring plate.

2. The steering mechanism of claim 1, wherein said rotating means is a linear actuator having a first end and a second end, wherein said first end of said linear actuator is coupled to said base plate and wherein said second end of said linear actuator is coupled to said spring plate.

3. The steering mechanism of claim 2, further comprising a first ear provided on said base plate and a second ear provided on said spring plate, wherein said first end of said linear actuator is coupled to said first ear and wherein said second end of said linear actuator is coupled to said second ear.

4. The steering mechanism of claim 3, wherein said base plate is provided with a sleeve slidably engaged to said first upright and wherein said first ear is secured to said sleeve.

5. The steering mechanism of claim 1, wherein said spring is fluid filled.

6. The steering mechanism of claim 1, wherein said spring is pneumatic.

7. The steering mechanism of claim 1, further comprising a bearing provided between said spring plate and said base plate.

8. The steering mechanism of claim 1, further comprising a top plate coupled to said spring, said first upright and said second upright.

9. The steering mechanism of claim 1, wherein said first upright and said second upright are cylindrical.

10. The steering mechanism of claim 1, wherein said journal comprises a first ear coupled to said first upright and a second ear coupled to said second upright.

11. The steering mechanism of claim 1, further comprising a third upright slidably coupled to said spring plate.

12. A ride height adjustable vehicle comprising:
    (a) a frame;
    (b) a fluid tank with a capacity in excess of forty liters;
    (c) means coupled to said fluid tank for dispensing a fluid onto the ground;
    (d) a steering mechanism comprising:
        (i) a journal;
        (ii) a leg rotatably coupled within said journal, said leg having a first end and a second end;
        (iii) a wheel coupled to said first end of said leg;
        (iv) a base plate secured to said second end of said leg;
        (v) a spring having a first end and a second end;
        (vi) a first upright having a first end and a second end, wherein said first end of said first upright is secured to said journal and wherein said second end of said first upright is coupled to said second end of said spring;
        (vii) a second upright substantially parallel w/said first upright, said second upright having a first end and a second end, wherein said first end of said second upright is secured to said journal and wherein said second end of said second upright is coupled to said second end of said spring;
        (viii) a spring plate secured to said first end of said spring, wherein said spring plate is slidably coupled to said first upright and wherein said spring plate is slidably coupled to said second upright; and
        (ix) a linear actuator secured between said base plate and said spring plate; and
    (e) means for driving said wheel.

13. The steering mechanism of claim 12, further comprising a first ear provided on said base plate and a second ear provided on said spring plate, wherein a first end of said linear actuator is coupled to said first ear and wherein a second end of said linear actuator is coupled to said second ear.

14. The steering mechanism of claim 13, wherein said base plate is provided with a sleeve slidably engaged to said first upright and wherein said first ear is secured to said sleeve.

15. The steering mechanism of claim 12, wherein said spring is fluid filled.

16. The steering mechanism of claim 12, wherein said spring is pneumatic.

17. The steering mechanism of claim 12, further comprising a bearing provided between said spring plate and said base plate.

18. The steering mechanism of claim 12, further comprising a top plate coupled to said spring, said first upright and said second upright.

19. The steering mechanism of claim 12, wherein said first upright and said second upright are cylindrical.

20. The steering mechanism of claim 12, wherein said journal comprises a first ear coupled to said first upright and a second ear coupled to said second upright.

* * * * *